No. 699,151. Patented May 6, 1902.
A. G. COUCH.
CASING FOR HORSE COLLARS.
(Application filed Oct. 7, 1901.)
(No Model.) 2 Sheets—Sheet 1.
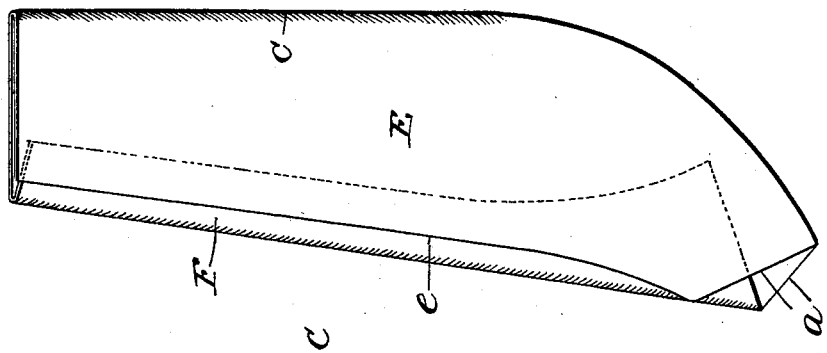
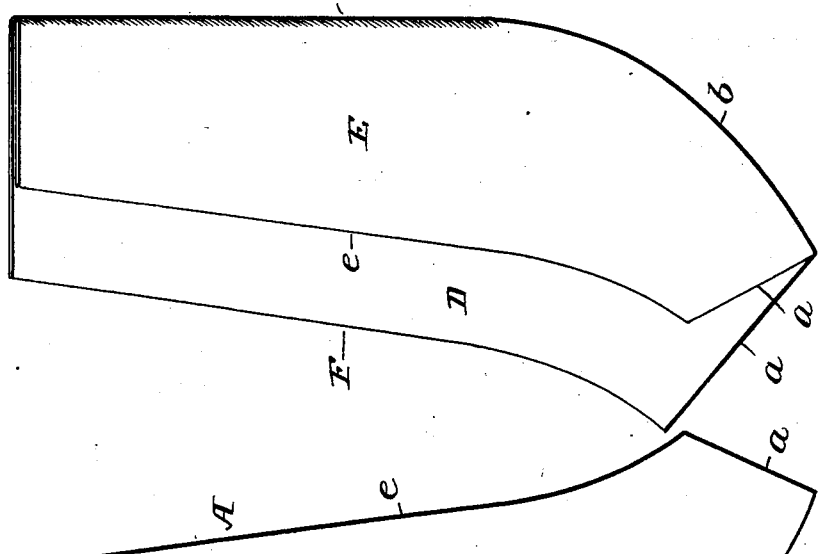
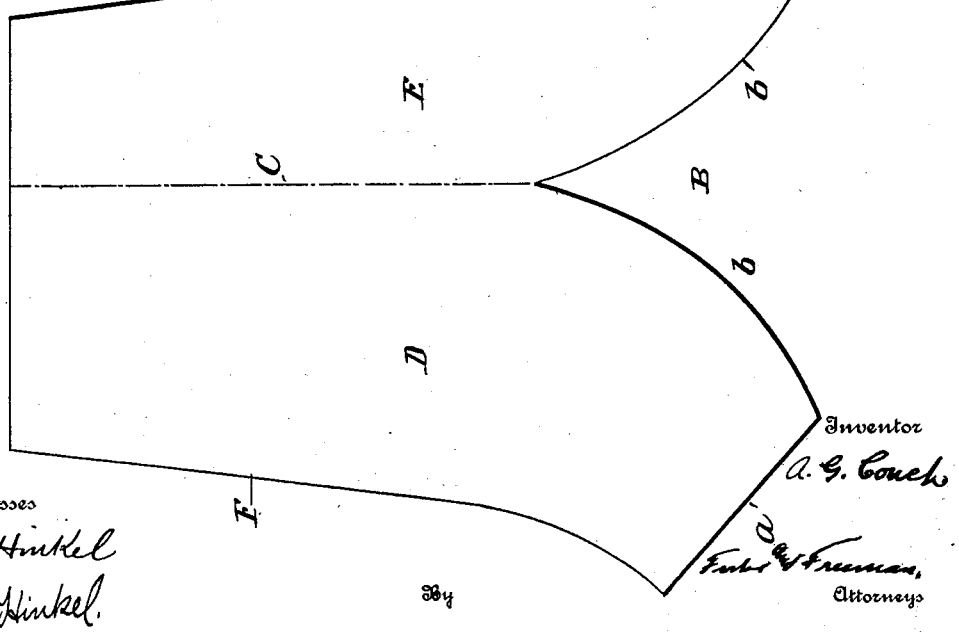
Witnesses
J. G. Hinkel
F. P. Hinkel
Inventor
A. G. Couch
By
Attorneys
THE NORRIS PETERS CO., PHOTO-LITHO., WASHINGTON, D. C.

No. 699,151. Patented May 6, 1902.
A. G. COUCH.
CASING FOR HORSE COLLARS.
(Application filed Oct. 7, 1901.)
(No Model.) 2 Sheets—Sheet 2.
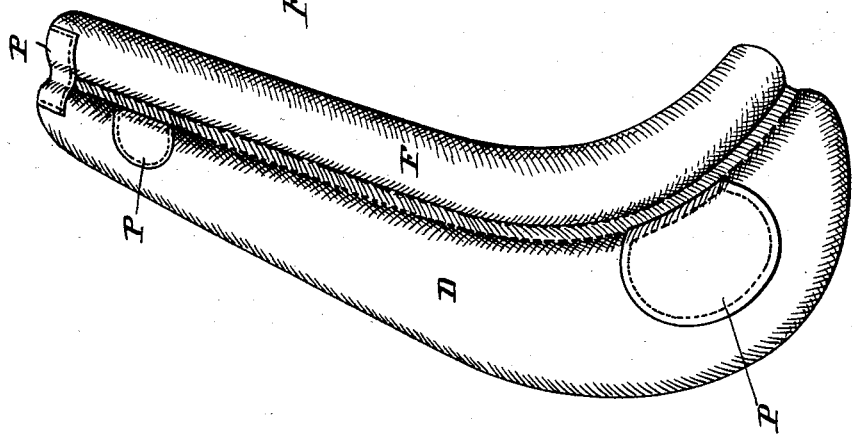
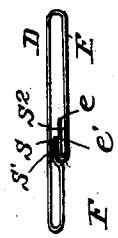
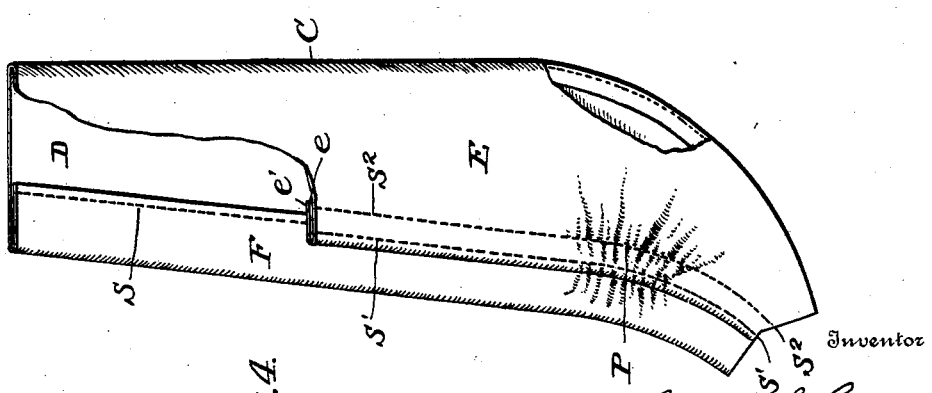
Witnesses
J. G. Hinkel
F. P. Hinkel
Inventor
Andrew G. Couch
By Fisher & Freeman
Attorneys
THE NORRIS PETERS CO., PHOTO-LITHO., WASHINGTON, D. C.

UNITED STATES PATENT OFFICE.

ANDREW G. COUCH, OF ATLANTA, GEORGIA, ASSIGNOR TO COUCH BROTHERS & J. J. EAGAN COMPANY, OF ATLANTA, GEORGIA, A CORPORATION OF GEORGIA.

CASING FOR HORSE-COLLARS.

SPECIFICATION forming part of Letters Patent No. 699,151, dated May 6, 1902.

Application filed October 7, 1901. Serial No. 77,884. (No model.)

*To all whom it may concern:*

Be it known that I, ANDREW G. COUCH, a citizen of the United States, residing at Atlanta, in the county of Fulton and State of Georgia, have invented certain new and useful Improvements in Casings for Horse-Collars, of which the following is a specification.

My invention relates to horse-collars, and more particularly to casings for the collars.

The object of my invention is to lessen the amount of seams or stitches necessary in making the collar-casing and to reduce the number of pieces used and curves necessary in the same, thus saving the amount of material which would be wasted in cutting out a casing containing more pieces and curves, for wherever a curve occurs material is wasted.

My collar-casing is made entirely from the outside in two sections, joined at the middle, each section being made from a single piece of material, while at the same time all raw edges are thrown on the inside, and, moreover, the casing does not have to be turned after it has been stitched. The stitching is done from the outside, and all raw edges are inside. By a suitable arrangement of stitching I am enabled to form a substantially flat-bottom hame-crevice in the collar for the hames to work in, which prevents the hames from working out of the collar in backing or in holding back in going downhill.

My invention consists in the sections of casing as described and illustrated in the details of manufacture and construction in the accompanying specification and drawings, in which—

Figure 1 is a plan view of a section of the casing before folding. Fig. 2 is a plan view of a section of the casing folded upon itself into unequal parts. Fig. 3 is a plan view showing a section of casing folded upon itself with a portion of the wider part folded inward. Fig. 4 is a plan view of a section of the casing folded into overlapping portions. Fig. 5 is an end view of Fig. 4, showing the folds and stitching; and Fig. 6 is a perspective view of a section of the casing stuffed.

Referring to the drawings, it will be noted that the figures taken in order from 1 to 4 substantially illustrate the method of making a section of casing for my horse-collar, it being understood that the making of but one section is illustrated, the collar being formed of two sections joined in the middle, the method of making each being the same.

In Fig. 1, A represents a piece of suitable material for the casing for a horse-collar, any suitable material being used; but in this instance it is preferred to use stout cloth, as canvas or duck, and, as shown in Fig. 1, the piece or strip of material A is shaped to the desired form, with curved sides and a V-shaped notch cut in the upper portion of the strip, this notch being shown with convex edges *b*, the tops *a* of the strip, which eventually form the throat of the casing, being sloped away, as shown.

In Fig. 2 the piece of material A is shown folded upon itself down a crease C into two unequal parts, of which D is shown wider than E. A portion F of the wider strip D is then folded inward upon itself, as shown in Fig. 3, to form a rim or neck portion for the collar when it is stuffed, as hereinafter to appear. The edge *e* of the narrower part of the section of casing is then folded inward, as shown in Fig. 4, at *e'*, so that the inwardly-folded portions F and *e'* overlap each other any desired distance, the arrangement of parts being such, as shown, that the rim F is substantially narrower than the main portion E of the section of casing. Upon folding the material in the first instance upon itself into unequal parts the material is presumed to have been cut in such manner that the folding will cause the edges *b b* of the V-shaped notch to substantially meet, so that they may thereafter be turned inward and stitched together to form the curved portion of the collar after it is stuffed.

In Fig. 5 the rim F is shown first folded over, and the narrower part E of the section is shown folded down with an inturned edge *e* overlapping the rim F. When a portion of the wider part of the casing is first folded down, it is preferred to stitch it with a line of stitching, as at S, this stitching being done from the outside and passing through the folded portion F and the main portion D of the casing. Then when the inturned edge of the narrower part E is folded to overlap the rim F, it is preferred that the inturned edge shall overlap the stitching S and then another line of stitching S' is passed through all the folds and parts of the section from the outside, thus firmly securing the parts together along a line substantially parallel to the edge of the rim, and the section can be stuffed after it has been formed as so far described, provided the substantially meeting edges $b$ of the notch B have been stitched together; but before stuffing I prefer to stitch the overlapping portions and parts of the collar together by another line of stitching $S^2$ from the outside and at a little distance, from a quarter to half an inch, from the lines of stitching S S', so that when the rim and main portion of the casing are stuffed with any suitable material there will remain a crevice for the hames between the rim and the main portion, this crevice having a substantially flat bottom in which there is no stuffing, and, as hereinbefore described, this crevice will prevent the hames from working out under the various strains which they must undergo and is a far preferable construction to the form where but a single line of stitching is used between the parts of the casing where the hames may not fit down into the crevices. Suitable pads P, of leather or other material to resist wear, may be fastened to the section in the usual places. In order to give the proper curved shape to the section of casing when stuffed, puckers P' should be formed in the material near the notched portion.

Without limiting myself to the precise construction and arrangement of details herein shown and described, I claim and desire to obtain by Letters Patent the following:

1. A casing for a section of a horse-collar, consisting of a single piece of material provided with a V-shaped notch and folded upon itself into two unequal parts, the edges of the notch substantially meeting and being stitched together, the wider part of the casing being folded inward upon itself to form a rim, the edge of the narrower part of the casing being turned inward but overlapping the folded portion of the wider part of the casing, the whole being united by stitching from the outside through the overlapping portions of the casing, substantially as described.

2. A casing for a section of a horse-collar, consisting of a single piece of material provided with a V-shaped notch and folded upon itself into two unequal parts, the edges of the notch substantially meeting and being stitched together, the wider part of the casing being folded inward upon itself to form a rim and held by a line of stitching, the edge of the narrower part of the casing being also turned inward but overlapping the stitching of the rim, the whole being united from the outside by stitching through the folded portions and parts of the casing, and the material being puckered near the notched portion to give a curved shape to the casing when stuffed, substantially as described.

3. A casing for a section of a horse-collar, consisting of a single piece of material provided with a V-shaped notch and folded upon itself into two unequal parts, the edges of the notch substantially meeting and being stitched together, the wider part of the casing being folded inward upon itself to form a rim and held by a line of stitching, the edge of the narrower part of the casing being also turned inward but overlapping the stitching of the rim, the whole being united from the outside by substantially parallel rows of stitching through the folded portions and parts of the casing, substantially as described.

4. A casing for a section of a horse-collar, consisting of a single piece of material provided with a V-shaped notch and folded upon itself into two unequal parts, the edges of the notch being stitched together, the wider part of the casing being folded inward to form a rim, the edge of the narrower part of the casing overlapping the folded portion of the wider part, the whole being united by stitching from the outside through the overlapping portions of the casing, substantially as described.

5. A casing for a section of a horse-collar, consisting of a piece of material provided with a notch and folded upon itself into two parts, the edges of the notch being stitched together, one part of the casing being folded inward to form a rim, the edge of the other part of the casing overlapping said inwardly-folded portion, and the whole being united by stitching through the overlapping portions of the casing, substantially as described.

6. A casing for a section of a horse-collar, consisting of a piece of material provided with a notch and folded upon itself, one portion of the casing being folded inward to form a rim and another portion overlapping said inwardly-folded portion, the whole being united by stitching, substantially as described.

In testimony whereof I have signed my name to this specification in the presence of two subscribing witnesses.

ANDREW G. COUCH.

Witnesses:
G. W. TRADER,
B. F. BEDENBAUGH.